Dec. 15, 1964 W. J. HALL 3,160,972
SLIDE CHANGER
Filed Aug. 3, 1961 2 Sheets-Sheet 1

Inventor:
Walter J. Hall
By Robert F. Miehle, Atty.

Dec. 15, 1964 W. J. HALL 3,160,972
SLIDE CHANGER
Filed Aug. 3, 1961 2 Sheets-Sheet 2

Inventor:
Walter J. Hall
By Robert F. Miehle, Atty.

United States Patent Office 3,160,972
Patented Dec. 15, 1964

3,160,972
SLIDE CHANGER
Walter J. Hall, Chicago, Ill., assignor to Bell & Howell Company, Chicago, Ill., a corporation of Illinois
Filed Aug. 3, 1961, Ser. No. 129,158
8 Claims. (Cl. 40—79)

This invention relates to slide changers and constitutes an improvement over the invention disclosed in Badalich Patent No. 2,724,989 dated November 29, 1955 and assigned to the assignee of this application.

An object of this invention is the provision of a slide changer mechanism which will automatically feed slides into and out of registry with the light beam of a projector in an efficient and economical manner and with a minimum amount of effort on the part of the user.

Another object of this invention is the provision of a push bar operating lever which pushes and pulls the slides and indexes the slide tray forwards or backwards by a reciprocating motion of said push bar without the necessity of the operator turning an advancing knob.

A further object of this invention is the provision of a means whereby the automatic tray moving means may be locked out of operation when one wishes to move the tray manually.

For a more complete understanding of the nature and scope of this invention, reference can be had to the following description taken together with the accompanying drawings in which.

Figure 1:
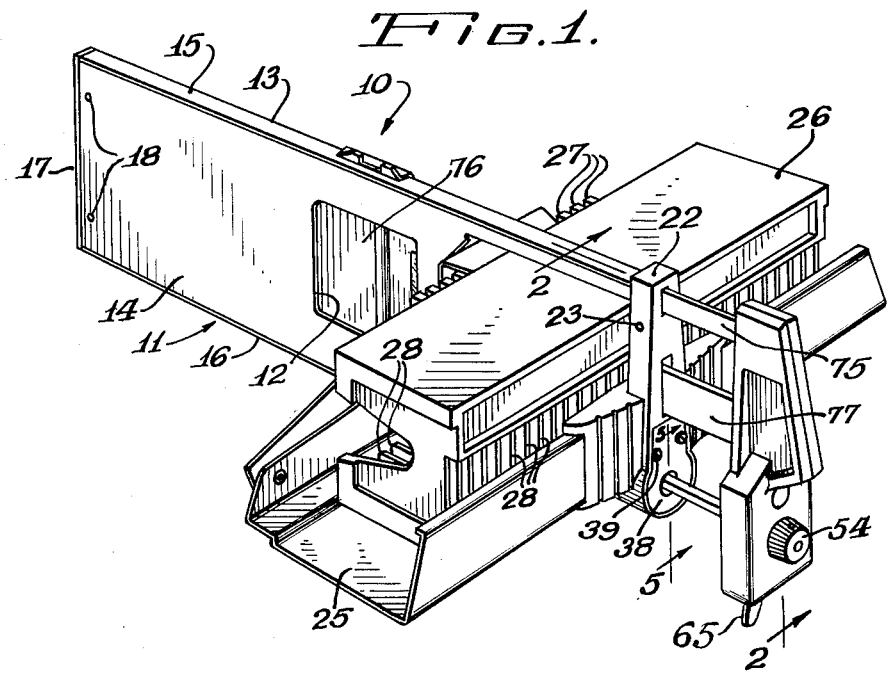
FIG. 1 is a perspective view of a slide changer mechanism incorporating the features of the present invention.

Referring now particularly to FIG. 1, it will be observed that the reference character 10 designates, generally, a slide changer for a slide projector constructed in accordance with this invention. The slide changer 10 includes a frame, shown generally at 11, having an aperture 12 intermediate its ends through which the light beam of the projector is projected and in which the slides to be displayed are inserted. The frame 11 is formed by sheet metal front and back plates 13 and 14. The former has its top edge 15 and its bottom edge 16 turned backwardly to overlie the upper and lower edges of the back plate 14. An end plate 17, such as a die casting, is employed between the plates 13 and 14 at one end thereof. It includes a flange (not shown) which projects into the space between the plates 13 and 14 and is secured into position by means of rivets 18.

Figure 2:
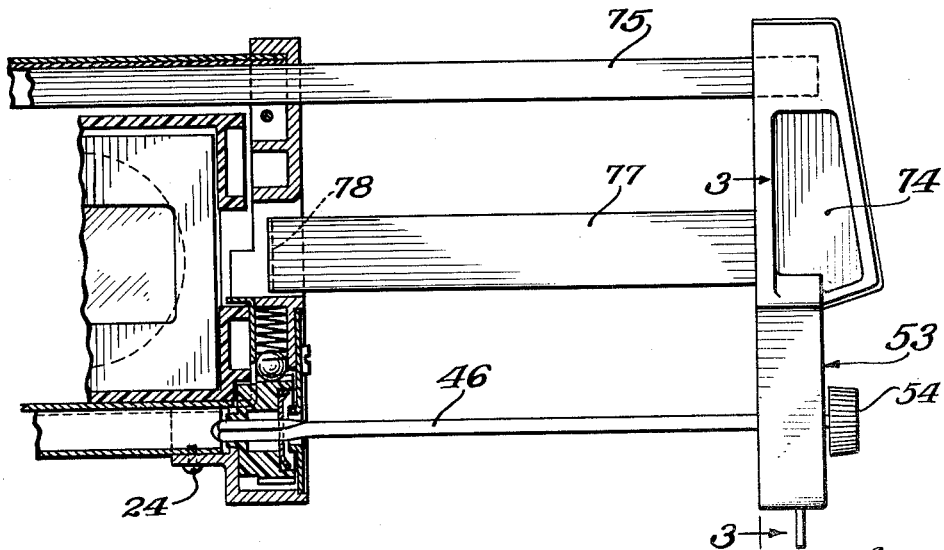
FIG. 2 is a longitudinal sectional view of the push bar operating lever of the slide changer taken along the line 2—2 of FIG. 1.

At the other end of the frame 11 there is an end plate 22 which may be a die casting. It is held in position overlying the end of the frame 11 by means of a rivet 23 and a screw 24 on the under side as shown more clearly in FIG. 2.

Extending transversely of the frame 11 and along the light beam which is projected through the aperture 12 is a sheet metal tray holder 25. The tray holder 25 is arranged to slidably receive a tray 26 that may be formed of molded plastic. The tray 26 is arranged to hold a series of slides 27 which are of conventional construction, the slides being held in parallel spaced relation by dividers or septums 28, which are molded integrally with the tray 26. It will be understood that the slides 27 are arranged to be moved out of the tray holder 25 and across the aperture 12 through the light beam and then returned to the tray holder 25. The manner in which this is accomplished will be described presently.

Figure 5:
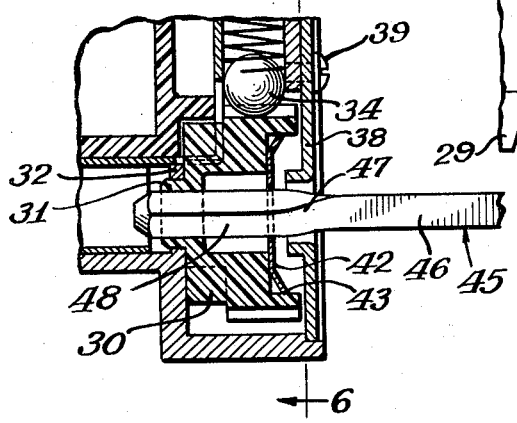
FIG. 5 is a sectional view of a portion of the frame taken along line 5—5 of FIG. 1.
Figure 6:
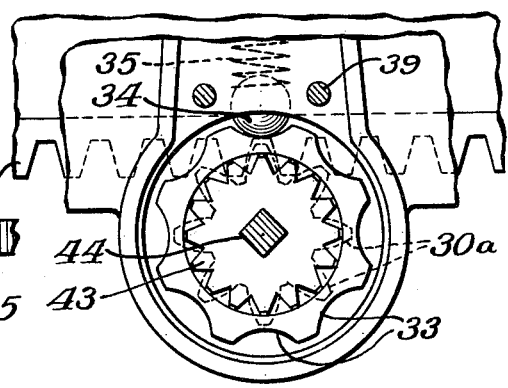
FIG. 6 is a detailed sectional view taken generally along line 6—6 of FIG. 5.

As shown more clearly in FIGS. 5 and 6, the underside of the tray 26 is provided with a lengthwise extending rack 29. A pinion 30 preferably formed of nylon and having a cylindrical bushing 31 formed integral therewith is mounted for rotational movement in bearings 32 in end plate 22. The pinion 30 has gear teeth 30a meshing with the teeth of the rack 29 so that on rotation of the pinion 30, the tray 26 is moved along the tray holder 25 in either a forward or reverse direction, depending upon the direction of rotation of the pinion.

In order to assure alignment of the various slides 27 in the septums 28 with the walls 13, 14 of the frame 11, the pinion 30 has peripheral recesses 33 on the portion of its surface not provided with the gear teeth 30a. These recesses cooperate with a spring pressed detent. The detent comprises a ball 34 and a compression spring 35 located in a suitable socket in the end plate 22 as shown in FIG. 6. As the detent is moved into successive recesses, the slides are indexed, one by one, into alignment with the frame 11. A cover plate 38 covers the end plate 22 and holds the pinion against longitudinal movement. The cover plate 38 can be attached to the end plate 22 by means such as screws 39. Locked within the pinion 30 by means of teeth 43 is an insert 42 made of some yieldable material such as spring bronze. The teeth 43 are mounted at an angle to the plate from which they are formed and consequently tend to dig into the material of the pinion when pressed there into so as to prevent rotation of the pinion relative to the insert.

It will be observed that the insert 42 has a square opening 44 in the center thereof. This opening 44 acts as a guide for the square shaft 45 and interfits therewith. The shaft 45 has an extended portion 46 of constant cross-section as well as a short portion 48 which has been axially twisted at 47 with respect to portion 46. The angle of twist is related to the number of teeth in pinion 30. If there are eight teeth on the pinion as shown in FIG. 6, then the angle of twist at 47 would be approximately 45°. At the extreme end of portion 46 there is a reduced portion 51 mounted for rotation in bearing 52 formed in a pusher bar operating lever 53. A knob 54 is held fast by means such as a set screw 55 to the portion 51 and is used for manual movement of the tray when such is desired.

Figure 4:
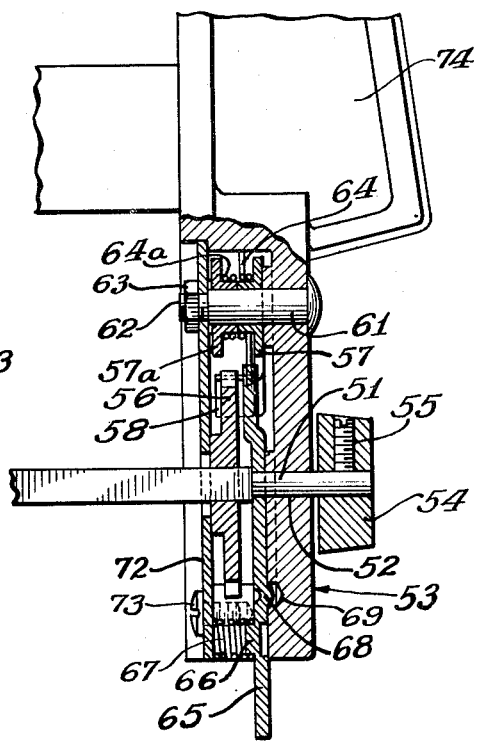
FIG. 4 is a sectional view of one end of the push bar operating lever taken along the line 4—4 of FIG. 3.

To provide for automatic indexing of the slide tray 26 as the push bar 53 is reciprocated, a one-way clutch type of arrangement is used. This arrangement consists generally of an indexing disk 56, a pair of pawls 57, 57a and a control lever 65. The indexing disk 56 is mounted on shaft 45 for rotational movement therewith. The pawls 57, 57a have ends 58 and 59 respectively, only one of which can be in engagement with the notches 60 in the indexing disk 56 at one time. The pawls 57 ande 57a are pivotally mounted on pin 61 and are biased toward the indexing disk 56 by means of hairpin springs 64, 64a. The pin 61 has a threaded end portion 62 adapted to receive a nut 63 for holding a cover plate 72 to the pusher bar. Control lever 65 is pivotally mounted on shaft 51 and has cam surfaces 65a, 65b which are adapted to contact pawls 58 and 59 respectively. At the lower end of the control lever 65 as seen in FIG. 4 a projection 66 has been made. This projection carries a spring 67 which biases the control lever 65 against the push bar recess. Projections 68 on the other side of the lever 65 constitute detent means which co-act with recesses 69 in the push bar to yieldably lock the control lever in any one of three positions. When the lever 65 is in the extreme clockwise position shown, pawl 59 is cammed out of contact with the indexing disk 56 while pawl 58 is cammed into contact with the disk. In the extreme counterclockwise position of lever 65 the pawl 59 can contact the disk while in the intermediate position, neither pawl can contact the disk. By positioning the lever in either of its extreme positions the slide tray 26 will be moved in one direction or the other. When the lever is in its neutral position the knob 54 can be used to move the tray 26. The various elements which are placed in the recess of the push bar are covered by a plate 72 held in place by screws 73 and nut 63. The push bar has a gripping area 74 formed so as to be easily held by the user.

The pusher bar operating lever 53 is mounted for sliding movement with respect to the frame 11 and has an upper arm 75 affixed thereto which is adapted to slide within the frame 11. The arm 75 is arranged to cooperate with the shutter 76 by means of a lost motion connection more fully described in said aforementioned Patent No. 2,724,989. Extending from the center of the pusher bar is a lower arm 77 which is attached to the pusher bar and formed so as to cooperate with a slide 27 in the tray 26 by pushing said slide into top and bottom guides (not shown) in the frame until it contacts the shutter 76. Continued movement of the lower arm 77 will cause the slide to push the shutter back into the frame. On the return stroke of the pusher bar, the arm 77 will pull the shutter which will in turn push the slide back into the slide tray.

Figure 3:
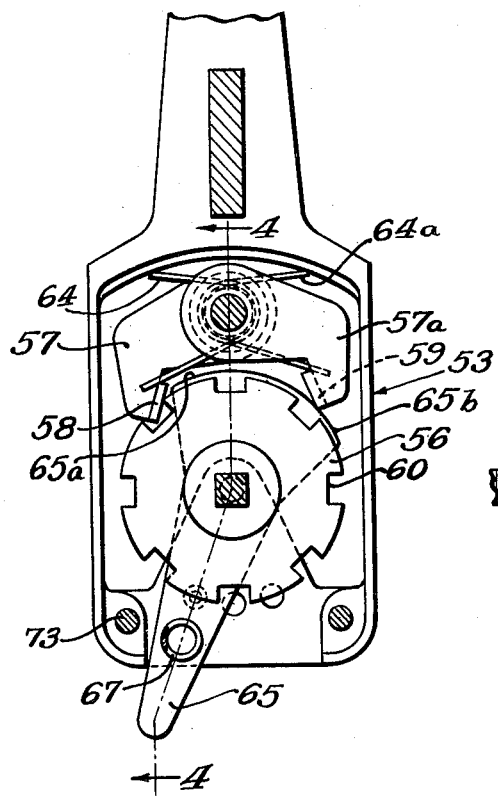
FIG. 3 is a sectional view of one end of the push bar operating lever taken along the line 3—3 of FIG. 2.

The general operation of the slide changer mechanism is as follows: With the push bar 53 pulled away from the frame, a tray 26 containing slides 27 is inserted in the tray holder 25 and pushed forward till the rack 29 engages the pinion 30. The pusher bar 53 is then pushed inwardly. Assuming that the control lever 65 is in the position shown in FIG. 3 the indexing disk 56 is prevented by the pawl 58 from turning clockwise and therefore the shaft 45, being integral with the disk, cannot turn clockwise. Since the shaft cannot turn, it will be readily seen in FIG. 5 that the pinion 30 must turn as the portion 47 of the shaft is pushed to the left since it is guided on shaft 45 by insert 42. This turning of the pinion will cause the tray 26 to index one notch. On the return movement of the pusher bar the shaft 45 will rotate as portion 47 passes through insert 42. This is true since detent means 33, 34 will hold the pinion in position while the indexing disk 56 will rotate counterclockwise to the succeeding notch. The disk 56 will rotate rather than the pinion 30 since it can cam the pawl 58 upwardly (FIG. 3) with very little force. If the tray is to be moved backwards automatically, the control lever 65 should be moved to its extreme counterclockwise position (FIG. 3). When the lever is in the neutral position, neither pawl will contact the disk 56 and no automatic feeding can take place. However, in this position the knob 54 can be used to move the tray backwardly or forwardly at will. When a pawl is engaged, the manual knob can also be used to move the tray in the same direction as it would ordinarily move but it could be advanced many positions at once rather than the one position possible when the push bar is moved into and out of the tray.

The construction shown for the various elements of the invention is intended to be merely illustrative and is not intended to limit the scope of the invention, the scope being limited only by the scope of the following claims. It will be observed that the slide changer would be operable to feed slides forwardly automatically even if the control lever 65 and manual control knob 54 were deleted therefrom. Also, the invention is not limited to the use of a square twisted shaft 45 since a straight shaft having a helical groove or projection at one end cooperating with a complementary shape on the pinion insert 42 could be used.

While the invention is thus described, it is not wished to be limited to the precise details described, as changes may be readily made without departing from the spirit of the invention.

What is claimed is:

1. In a slide changer for a slide projector, a frame extending transversely of the light beam of the projector and having an aperture therein, a tray holder, a slide actuator slidably mounted in the frame for pushing a slide to and from a tray in the tray holder, rotatable indexing means for indexing the tray, detent means tending to hold the indexing means against movement, shaft means including cam means, said shaft means carried rotatably by the slide actuator, said rotatable indexing means including cam follower means adapted to cooperate with said cam means for driving the indexing means, and ratchet means mounted on the actuator for holding said shaft from rotation in one direction while permitting rotation of the shaft by the cooperating cam and cam follower means in the opposite direction near one end of the movement of the slide actuator, said indexing means and said ratchet means being splined to the shaft.

2. In a slide projector of the type including a frame having an aperture therein, a tray holder extending transversely of the frame and parallel to the light beam of said projector, the improvement comprising: means on the tray holder for moving a tray longitudinally of said tray holder, a slide actuating member slidably mounted in said frame and adapted to move a slide out of a tray in said tray holder and into said aperture and out of said aperture and back into said tray, a rotatable shaft carried for reciprocation with said actuating member and for movement with respect to said tray moving means, means associated with said tray moving means for releasably holding said tray in positions in which successive slide compartments of said trays are aligned with said actuating member, a one-way clutch connected with and preventing rotation of said shaft in one direction, said shaft including cam means, cam follower means on said tray moving means, said cam and cam follower means cooperating a first time at one end of the movement of said shaft to rotate said tray moving means when said shaft is moving in a first direction, said clutch permitting rotation of said shaft by means of said cam and cam follower means cooperating a second time at the same end of movement of said shaft when said shaft is moving in a second direction.

3. A slide projector as set forth in claim 2 in which the means for releasably holding the tray comprises a yieldable detent means, and in which the one-way clutch comprises a ratchet wheel and at least one pawl yieldably engaged therewith.

4. A slide projector as set forth in claim 3 in which a pair of pawls are mounted for alternate engagement with the ratchet wheel and in which a lever is pivotally mounted for engagement with said pawls whereby either one or both of said pawls may be held out of contact with said ratchet wheel.

5. A slide projector as set forth in claim 2 in which the shaft has a knob fastened thereto, whereby the shaft may be turned manually in a direction permitted by the one-way clutch.

6. A slide projector as set forth in claim 2 in which the tray moving means comprises a toothed pinion adapted to engage a rack formed in the slide tray and in which the cam follower means is fixedly mounted with respect to the pinion.

7. A slide projector as set forth in claim 6 in which the shaft has a polygonal cross-section and is twisted at one end to form the cam means, the cam follower having a complementary polygonal shaped opening therein adapted to interfit with the shaft, whereby, when the shaft is reciprocated through the cam follower in one direction of movement the follower will be rotated while reciprocation in the other direction of movement will cause the shaft to rotate.

8. A slide changer for a projector comprising, in combination, a frame extending transversely of the light beam of the projector and having an aperture therein, a tray holder extending transversely of said frame for supporting a slide tray for longitudinal movement parallel to said light beam, a slide actuator slidably mounted in said frame for movement through said tray so as to move slides in said tray individually out of said tray and into said aperture and out of said aperture and back into said tray, means on said frame for longitudinally moving said tray along said tray holder comprising a tray advancing member mounted for rotation on said frame on an axis extending longitudinally of the path of said slide actuator, a shaft carried for reciprocation with said slide actuator and extending longitudinally of the path thereof and rotatably mounted with respect thereto and slidably engaged with said advancing member, yieldable detent means associated with said tray moving means for releasably positioning said tray in positions in which successive slide compartments of said trays are aligned with said slide actuator, a one-way clutch connected with and preventing rotation of said shaft in one direction, said shaft including cam means and cam follower means on said tray advancing member for cooperating with said cam means and operative with longitudinal movement of said shaft relative to the axis of said tray advancing member and in cooperation with said clutch to rotate said tray advancing member and advance said tray from one slide compartment aligning position to the next at one end of the movement of said slide actuator in one direction, said clutch permitting rotation of said shaft by said cam and cam follower means with movement of said slide actuator in the other direction.

References Cited in the file of this patent
UNITED STATES PATENTS

| | | |
|---|---|---|
| 633,623 | Squire | Sept. 26, 1899 |
| 867,197 | Hamm | Sept. 24, 1907 |
| 949,397 | Magone | Feb. 15, 1910 |
| 2,724,989 | Badlich | Nov. 29, 1955 |
| 2,837,851 | Wiklund | June 10, 1958 |
| 2,874,497 | Huff | Feb. 24, 1959 |
| 2,998,750 | King | Sept. 5, 1961 |
| 3,025,760 | Jungjohann | Mar. 20, 1962 |

FOREIGN PATENTS

| | | |
|---|---|---|
| 190,287 | Switzerland | 1937 |